Nov. 11, 1930.   M. ALLAND   1,781,359

MIXING DEVICE

Filed Sept. 8, 1928

Witness:
Walter Chew

Inventor
Maurice Alland
by J. Stuart Freeman,
Attorney

Patented Nov. 11, 1930

1,781,359

UNITED STATES PATENT OFFICE

MAURICE ALLAND, OF ATLANTIC CITY, NEW JERSEY

MIXING DEVICE

Application filed September 8, 1928. Serial No. 304,740.

The object of the invention is to provide improvements in fluid mixing devices, and especially in that type which is designed to facilitate the preparation of antiseptic and other fluids for use in douching the various cavities of the human body, including the oral, nasal, auditory and reproductive organs, the only difference or variation in the use of the device being the use of tubing, nozzles and solutions of varying strength and substance.

Another object is to provide a device for this purpose which can be readily attached to and detached from the usual faucet such as is found in the bathtub or basin of a present-day lavatory, laboratory, or operating room.

A further object is to provide a device which is equally adapted for use in the preparation of a douche from either liquids, or from soluble solid substances, and in which device the container for the douche substance is adapted to remain as long as desired in either operative or inoperative position, in one case another fluid such as water mixing with the substance as it passes through the device, and in the other case the water or carrier fluid passing freely through the device without having any of the substance added thereto.

Still another object is to provide the combination of a casing having a removable closure provided with an aperture, a substance container slidably supported within said aperture and itself having a removable closure for its filling port, the sides of said container being provided with spaced apertures which are automatically closed when the container is in inoperative position, and which apertures when said container is in operative position being exposed upon the inside of the casing and adapted to admit a fluid solvent into said container, and to permit the flow of dissolved substance from within said container into the interior of said casing.

And a still further object is to provide such a device as hereinbefore set forth, comprising the said casing and slidably positioned container, with means to maintain said container in its innermost or operative position with relation to said casing, and fluid-tight means so arranged that fluid pressure flowing through said casing will maintain said container in extended position and seal the joint between them when said first means is disengaged.

Figure 1:
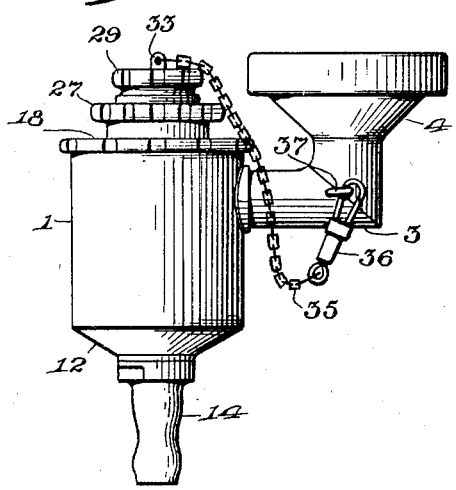
Figure 2:
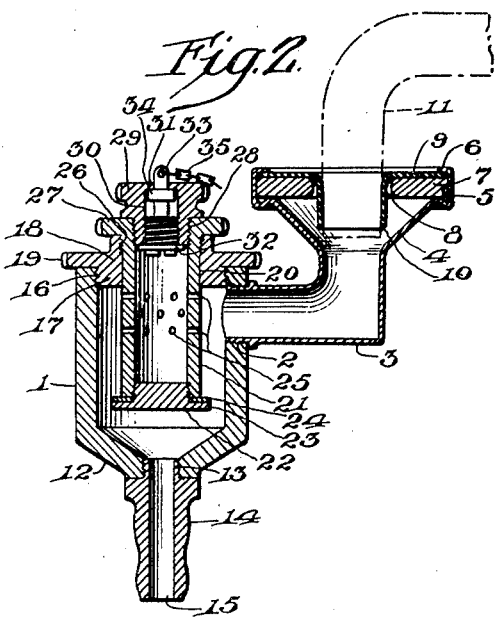
Figure 3:
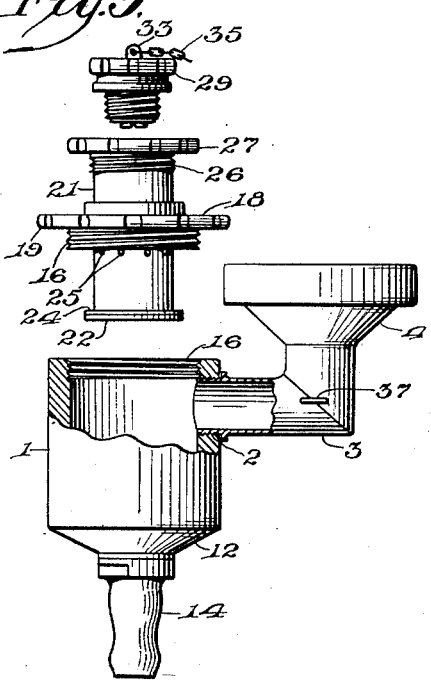
Figure 4:
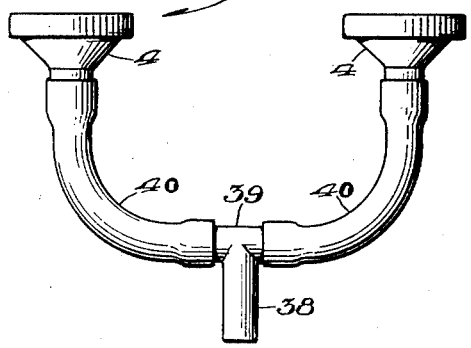

With these and other objects in mind, the present invention comprises further details of construction and operation fully brought out in the following description, when read in conjunction with the accompanying drawings, in which Fig. 1 is an elevation of one embodiment of the invention; Fig. 2 is a vertical, longitudinal section of the same; Fig. 3 is a view showing the parts of the device disassembled and in elevation but in their normal alignment with the outside casing, a portion of which is broken away; Fig. 4 is an elevational view of an attachment for connecting and mixing the hot and cold water (or other fluid) from a plurality of faucets or the like (not shown).

Referring to the drawings, one embodiment of the invention comprises a preferably cylindrical casing 1, having an inlet opening 2, into which is normally secured a suitable elbow or other shape of tubular fluid-conveying member 3, the outer free end portion of which is preferably flared at 4 and thence provided with an annular recess 5 bounded by an inturned flange 6, in said recess there being positioned a disc 7, having an aperture 8, while a disc 9 of yielding material, such as rubber or the like, is secured at its outer periphery between the disc 7 and the flange 6, and radially inwardly is provided with an aperture 10 adapted to receive a supply tube or faucet 11 by extending in cylindrical shape through the aperture 8 in said disc 7.

The lower portion 12 of the casing 1 is preferably conical in shape and provided with an outlet opening 13 into which is normally secured an end of a nozzle or tube connection 14, having a discharge bore 15. The upper portion of said casing is open and provided with an aperture 16 normally connected with what is the threaded portion 17 of a plug or cap 18, provided with a circumferentially knurled or notched flange 19, normally in binding engagement with the upper free end of said casing.

The plug or cap 18 is provided centrally with an axial bore 20 in which is slidably positioned a cylindrical container 21, the lower end of which is closed by a plug 22, having a flange 23 which supports a gasket 24 in such position that the gasket extends radially beyond the outer limits of the adjacent portion of said cylinder. The walls of said cylinder are provided with spaced perforations 25 at such distance from the closure plug 22 as to permit the use of the lower portion of the interior of said cylinder for the purpose of measuring any desired liquid, although said container is equally adapted to contain and operatively support particles of solid, yet soluble, substances, such as antiseptics and the like, including potassium permanganate.

The upper portion of the cylinder 21 is provided with threads 26 adapted to engage correspondingly positioned threads in the upper end portion of the aperture 20 in the closure 17, said cylinder terminating in a radially extending flange 27 which is also knurled or notched as may be desired. The otherwise open upper end portion 28 of said cylinder is normally closed by means of a removable plug 29, having an enlarged bore 30, terminating upwardly in an annular flange 31, there being positioned in said bore an externally threaded casing 32 in rotatable connection with which is a pin 33, having a flange 34 which is positioned within and is prevented from passing outwardly beyond the flange 31. To the outer end of the pin 33, extending freely beyond the cylindrical closure 29, there is secured in any suitable manner a flexible element 35, the opposite end of which is removably connected by means of a snap fastener or the like 36 to an eyelet 37 secured at any suitable point on the outer surface of the device.

In the operation of this device, it is to be understood that it may be connected to the discharge end of a water faucet or the like, as shown in Fig. 2, or it may be connected either directly or through the medium of a flexible tube with the discharge end 38 of a T 39, the oppositely extending arms of which are connected by means of tubing 40 to members 4, such as illustrated in Fig. 2, and which are adapted to be removably connected to hot and cold water faucets simultaneously in order that by regulating the flow of such relatively hot and cold water, the resulting temperature of the water passing from the T 39 into the casing 1 will be at the temperature desired. It is also to be understood that a tubular connection of any desired length, size, or material may be connected to the discharge connection or nozzle 14 of the device and in turn may be provided with any suitable type of nozzle depending upon the purpose for which the device is being used.

Having these facts in mind, either solid or liquid antiseptic, disinfectant, or other substance (not indicated) is placed within the lower portion of the container 21 after releasing its threaded connection 26, raising it, and removing the plug 29. With said cylinder made of bakelite or similar semi-transparent material, the quantity of the particular substance within said cylinder can be measured with accuracy and in this position it will be noted that the perforations 25 are not only removed from exposure to the interior of the casing 1, but are positioned, in fact, above the closure 18. After placing the desired substance within said cylinder, the plug 29 is replaced as shown in Figs. 1 and 2 and the cylinder lowered into the operative position also shown. Dissolving liquid such as water passing through the inlet 2 passes to a certain degree through the perforations 25 and there mixes with, dilutes, or dissolves, a portion of the substance above referred to and thence carries such portion outwardly through others of said perforations into the casing 1, thence through the outlet 13 and any tube or nozzle connected thereto.

When the cylinder 21 is in the operative position shown in Fig. 2, it is, as before stated, necessary in such position to secure it by means of the threads 26 in order to prevent its being forced outwardly therefrom by fluid pressure entering through the inlet 2. When it is desired that water or similar fluid from the faucet or the like 11 should pass through the device and any nozzle connected therewith, the threads 26 are released and the fluid pressure entering the inlet 2 automatically forces the cylinder 21 upwardly and maintains the same in such upper position with the closure flange 23 compressing the gasket 34 firmly against the under surface of the casing closure 18, after which the fluid passes through said casing without taking with it any portion of such substance as may be within the upwardly extending cylinder, and flows freely through and from the outlet 13.

Having thus described my invention, what I claim and desire to protect by Letters Patent of the United States is:—

1. A mixing device, comprising a casing having an inlet, an outlet and an aperture, a closure for said aperture also provided with an aperture, a cylindrical container longitudinally reciprocable in said closure aperture, and provided with perforations to permit fluid entering said inlet to pass into said cylinder from within said casing and thence again into said casing and through said outlet, means to positively maintain said container in operative position until removed therefrom, means to limit the outward movement of said container, said container being automatically moved into and maintained in inoperative extended position, upon the release of said first means, by fluid pressure within said casing, and means to seal the connection between said casing and said container while in inoperative position.

2. A mixing device, comprising a casing having an inlet, an outlet and an independent aperture, a removable closure for said aperture also provided with an aperture, a cylindrical container longitudinally reciprocable in said closure aperture in constant contact with the walls of said closure and provided in its side walls with perforations for the passage of fluid therethrough, means to limit the outward movement of said container, and means to positively maintain said cylindrical container in its innermost operative position, said perforations being unexposed to the interior of said casing when the container is in withdrawn position.

3. A mixing device, comprising a casing having an inlet, an outlet and an independent aperture, a removable closure for said aperture also provided with an aperture, a cylindrical container slidably positioned in said closure aperture and provided in its side walls with perforations for the passage of fluid therethrough, means to maintain said cylinder in its innermost operative position, said perforations being spaced from the bottom of said container and unexposed to the interior of said casing when in raised position, the lower end of said cylinder being closed by a plug having a flange extending radially beyond the limits of said cylinder, and a gasket supported by said flange and, when said cylinder is in extended position, cooperating with said apertured closure to seal the connection between said closure and said cylinder.

In testimony whereof I have affixed my signature.

MAURICE ALLAND.